(12) United States Patent
Shawabkeh et al.

(10) Patent No.: US 9,649,619 B2
(45) Date of Patent: May 16, 2017

(54) SODIUM-CALCIUM-ALUMINOSILICATE COLUMN FOR ADSORBING $CO_2$

(71) Applicant: KING FAHD UNIVERSITY OF PETROLEUM AND MINERALS, Dhahran (SA)

(72) Inventors: Reyad Awwad Shawabkeh, Dhahran (SA); Naim Moh'd Faqir, Dhahran (SA); Qusay Yousef Bkour, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/281,712

(22) Filed: Sep. 30, 2016

(65) Prior Publication Data

US 2017/0014799 A1    Jan. 19, 2017

Related U.S. Application Data

(63) Continuation of application No. 14/167,460, filed on Jan. 29, 2014, now Pat. No. 9,480,969.

(51) Int. Cl.
| | |
|---|---|
| *B01D 53/02* | (2006.01) |
| *B01J 20/16* | (2006.01) |
| *B01J 20/34* | (2006.01) |
| *B01D 53/04* | (2006.01) |
| *B01D 53/82* | (2006.01) |
| *B01D 53/62* | (2006.01) |

(52) U.S. Cl.
CPC ............. *B01J 20/16* (2013.01); *B01D 53/02* (2013.01); *B01D 53/04* (2013.01); *B01D 53/0423* (2013.01); *B01D 53/0446* (2013.01); *B01D 53/62* (2013.01); *B01D 53/82* (2013.01); *B01J 20/3483* (2013.01); *B01D 2251/304* (2013.01); *B01D 2251/404* (2013.01); *B01D 2253/104* (2013.01); *B01D 2253/106* (2013.01); *B01D 2253/108* (2013.01); *B01D 2253/1124* (2013.01); *B01D 2257/504* (2013.01); *B01D 2258/01* (2013.01); *B01D 2258/025* (2013.01); *B01D 2258/06* (2013.01); *B01D 2259/40* (2013.01); *Y02C 10/08* (2013.01)

(58) Field of Classification Search
CPC ........ Y02C 10/08; B01D 53/02; B01D 53/04; B01D 53/0423; B01D 53/0446; B01D 2259/40; B01D 2253/106; B01D 2253/108; B01D 2253/1124; B01D 2257/504; B01D 53/62; B01D 53/82
USPC ..... 95/116, 121, 139; 96/108, 143, 144, 153
See application file for complete search history.

(56) References Cited

U.S. PATENT DOCUMENTS

| | | |
|---|---|---|
| 2,908,639 A | 10/1959 | Carter et al. |
| 3,431,218 A | 3/1969 | Plank et al. |

OTHER PUBLICATIONS

Sigma-Aldrich, "Molecular Sieves", Sigma-Aldrich Technical Information Bulletin, (3 pages).
Pingxiang BaiSheng Chemical Packing Co., Ltd., "China CO2 Removal Absorbent", (3 pages).
Timothy D. Phillips, et al., "Hydrated Sodium Calcium Aluminosilicate: A High Affinity Sorbent for Aflatoxin", Feb. 1988, Poultry Science, vol. 67, No. 2, (2 pages).

*Primary Examiner* — Elizabeth Wood
(74) *Attorney, Agent, or Firm* — Oblon, McClelland, Maier & Neustadt, L.L.P.

(57) ABSTRACT

A new adsorbent $CO_2$-ONE for removal of acidic gases such as carbon dioxide and hydrogen sulfide was developed from hydrothermal reaction of natural limestone with natural kaolin via sodium hydroxide. Several synthesis conditions were employed such as initial concentration of NaOH, weight ratio of limestone to kaolin, reaction temperature and pressure. The produced Ca—Na—SiO2—Al2O3 samples were characterized using XRD and EDS and showed that a mixture of Gehlenite $Ca_2Al(Al_{1.22}Si_{0.78}O_{6.78})OH_{0.22}$ and Stilbite $Na_{5.76}Ca_{4.96}(Al_{15.68}Si_{56.32}O_{144})$ with percentage of 43 and 57 was successfully produced, respectively. Another produced sample showed the presence of Gehlenite $Ca_2Al(Al_{1.22}Si_{0.78}O_{6.78})OH_{0.22}$, Stilbite $Na_{5.76}Ca_{4.96}(Al_{15.68}Si_{56.32}O_{144})$ and Lawsonite $CaAl_2Si_2O_7OH_2(H_2O)$ with percentage of 4.1 and 7.4 and 88, respectively.

5 Claims, 8 Drawing Sheets

SODIUM-CALCIUM-ALUMINOSILICATE COLUMN FOR ADSORBING $CO_2$

CROSS-REFERENCE TO RELATED APPLICATIONS

This application is a continuation of Ser. No. 14/167,460, now U.S. Pat. No. 9,480,969.

BACKGROUND OF THE INVENTION

Technical Field

The present invention relates to a Ca—Na—$SiO_2$—$Al_2O_3$/Sodium-Calcium-Aluminosilicate composition, a method of making Ca—Na—$SiO_2$—$Al_2O_3$/Sodium-Calcium-Aluminosilicate composition, and a method for using the Ca—Na—$SiO_2$—$Al_2O_3$/Sodium-Calcium-Aluminosilicate as an adsorbent for the removal of $CO_2$ from a gaseous composition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Environmental pollution is one of the major problems facing humanity this century. Emission of toxic gases into the atmosphere is a primary source of air pollution. Combustion of heavy oil, coal and oil shale, exhausts from automobiles, as well as smelting operation, sulfuric acid manufacturing and metallurgical processes are the main sources for discharging of these toxicants into the atmosphere. These gases include: sulfur oxides ($SO_x$), nitrogen oxides ($NO_x$), carbon oxides ($CO_x$) and hydrogen sulfide ($H_2S$). Once these gases enter the troposphere, some of them react with water and oxygen molecules to form acid rain and return back to the ground. Other gases such as carbon dioxide and fluorinated hydrocarbons can escape to the outer layer of the atmosphere leading to depletion of the ozone layer and affect global warming.

Carbon dioxide specifically reached an alarming level in the atmosphere where a major change in global climate was noticed since the beginning of the $21^{st}$ century. It is estimated that the net increase of 13,000 million tons of $CO_2$ is added to the atmosphere annually[1]. The rising level of $CO_2$ is already affecting the atmosphere, sea level and ecological systems. The global sea level has raised 10 to 20 cm over the past century. In this current century this level is expected to rise by 88 cm. The current atmospheric concentration of carbon dioxide is 391.8 ppm, which is 30% greater than that of the pre-industrial level.

Natural gas accounts for emission of large quantity of $CO_2$. In 2004 the global emission of $CO_2$ from natural gas was 5.3 billion tons, while coal and oil produced 10.6 and 10.2 billion, respectively. This value is expected to increase to 11 billion tons which exceeds the one from combustion of coal and oil[2].

Adsorption is a promising technology for capturing of $CO_2$ from exhaust gas downstream. The advantage of this process is to utilize low cost adsorbents, naturally occurring materials or by-products of chemical industries that have high removal capacity. Among these materials are activated carbons, zeolites, fly ash, limestone and different metal oxides[6-12].

Limestone and kaolin are natural abundant materials which have large reserves worldwide. The main uses of these materials are in the cement industry and in the architectural industry.

Adsorption of carbon dioxide can be attained by different types of adsorbents. Generally those adsorbents can be classified into three different groups; organic-based materials, inorganic solids containing some transition metals, or activated carbonaceous materials. Several research articles were published in this regard. A summary of the most recent and promising results is provided below:

Sevilla and Fuertes[14] utilized activated carbon material prepared for adsorption of $CO_2$ from a $CO_2$—$N_2$ gas mixture. The adsorbent showed a surface area of 1020 $m^2/g$ and a pore volume of 0.91 $cm^3/g$ which can be enhanced to 2660 $m^2/g$ and 1.38 $cm^3/g$, respectively, by treatment with potassium hydroxide at 600-800° C. The sorption capacity was 3.2 mmol $CO_2$/g at 25° C.

Cen et al.[15] used commercial activated carbon adsorption of $CO_2$ from effluent of combustion process. A breakthrough adsorption experiment was performed with simulated flue gas of 12 vol. % $CO_2$. The kinetic parameters that affect the rate of adsorption of $CO_2$ in a fixed bed column was evaluated.

Schell et al.[16] studied adsorption equilibrium of $CO_2$, $H_2$ and $N_2$ on AP3-60 commercial activated carbon using a Rubotherm Magnetic Suspension Balance and gravimetric-chromatographic method. The results were fitted to Langmuir and Sips isotherms and compared to binary measurements.

Shao et al.[17] tested several carbonaceous mesoporous materials for adsorption of $CO_2$ by gravimetric analyzer (IGA-003, Hiden). It was found that $CO_2$ adsorption capacity of 909 mg/g has been achieved by the type ACB-5 at 298 K and 18 bar.

Karadas et at.[18] prepared metal carbonates consisting of Zn2+, Mg2+, and Cu2+ and measured the adsorption of $CO_2$ by this material using thermogravimetric analysis (TGA). Abid et al.[19] prepared zirconium-metal organic frameworks (Zr-MOFs) for adsorption of $CO_2$ and $CH_4$. The removal capacities for both gases were 8.1 and 3.6 mmol/g, respectively, obtained at 273K, 988 kPa. Addition of ammonium hydroxide during the synthesis of MOF lowered the sorption capacities but enhanced the selectivity of $CO_2$ over $CH_4$.

Wang et al.[20] investigated the ability of Si-doped lithium zirconate sorbents for adsorption of $CO_2$. Doping silicon in the adsorbent matrix could improve the sorption capacity.

Modak et al.[21] synthesized iron containing porous organic polymers (Fe-POPs). The adsorbent possessed a high BET surface area and appreciable $CO_2$ capture of 19 wt % at 273 K and 1 bar.

Kauffman et al.[22] evaluated the selectivity of adsorption of $CO_2$ from $N_2$, $CH_4$, and $N_2O$ gas mixture by dynamic porous coordination polymer using ATR-FTIR spectroscopy, GC, etc. They proved that all the selected techniques indicate high selective adsorption of $CO_2$ from $CO_2$/$CH_4$ and $CO_2$/$N_2$ mixtures at 30° C., while the system $CO_2$/$N_2O$ is not selective.

Wang and Yang[23] enhanced the porosity of silica SBA-15 by two template removal methods followed by amine grafting and used for removal of $CO_2$ from $CO_2$/$N_2$ gas mixture. The $CO_2$ sorption capacity was increased from 1.05 to 1.6 mmol/g when the silanol density was increased from 3.4 to 8.5 $OH/nm^2$ and the grafted amine loading was increased from 2.2 to 3.2 mmol/g.

Zhao[24] investigated the adsorption of $CO_2$ by Mg-modified silica. They developed the Mg-zeolite by methods of co-condensation, dispersion and ion-exchange where $Mg^{2+}$ ions were introduced into SBA-15 and MCM-41, and transformed into MgO in the calcination process. The adsorption capacity increased from 0.42 mmol/g of pure silica SBA-15 to 1.35 mmol/g of Mg—Al-SBA-1541 and increased from 0.67 mmol/g of pure silica MCM-41 to 1.32 mmol/g of Mg-EDA-MCM-41-D10 by ion exchange and dispersion methods, respectively.

Sonawane and Nagare[25] investigated theoretically the reactivity of Si-doped single walled carbon nanotubes for $O_2$, $CO_2$, $SO_2$ and $NO_2$ using density functional theory. They showed that the charge density, binding energy and density and charge transfer of state are the main factors for chemical adsorption of these gases by Si-CNT.

Xue et al.[26] showed that the selectivity and adsorption capacity of $CO_2$ were increased by addition of piperazine to methyldiethylamine during the modification of the surface of silica gels. The exit concentration from a column packed with this adsorbent has decreased from 13 wt. % to less than 0.05 wt. %.

Li[27] investigated the adsorption dynamics of $CO_2$ by a bed of sodium oxide promoted alumina. The breakthrough curve model was developed based on the experimental data. Zukal et al.[28] measured the adsorption isotherm of $CO_2$ on the Na-A zeolite in the temperature range from 273 to 333 K. The data were fitted to a periodic density functional model improved for the proper description of dispersion interactions.

Reinik et al.[29] synthesized calcium-silica-aluminum hydrate from oil shale fly ash by reaction with 5M sodium hydroxide at 130° C. The material was tested for its adsorption capacity of $CO_2$ using thermo-gravimetric analysis. The results showed an increase in capacity from 0.06 mass % when using untreated ash to 3-4 mass % after alkaline hydrothermal activation with NaOH.

The present disclosure describes mixtures of aluminosilicates linked with calcium and sodium oxides in a crystalline structure. The materials were used for adsorption of acidic gases such as $CO_2$ from a gas stream.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the present invention a includes a composition Ca—Na—$SiO_2$—$Al_2O_3$/Sodium-Calcium-Aluminosilicate composition.

In another embodiment the Ca—Na—$SiO_2$—$Al_2O_3$/Sodium-Calcium-Aluminosilicate is used as an adsorbent.

In another embodiment the Ca—Na—$SiO_2$—$Al_2O_3$ includes a mixture of Gehlenite and Stilbite.

In another embodiment the Ca—Na—$SiO_2$—$Al_2O_3$ includes a mixture of Gehlenite, Stilbite and Lawsonite.

In another embodiment the synthesis of Ca—Na—$SiO_2$—$Al_2O_3$ includes mixing limestone and kaolin with a base to form a mixture, hydrothermally treating the mixture with nitrogen, and calcining the mixture to form a mixture including Gehlenite and Stilbite.

In another embodiment a method includes adsorbing $CO_2$ from a gaseous composition by contacting the gaseous substance with the Ca—Na—$SiO_2$—$Al_2O_3$/Sodium-Calcium-Aluminosilicate in an isothermal column.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

A new mixture of aluminosilicates linked with calcium and sodium oxides in their crystalline structure is disclosed. The produced materials were tested for adsorption of acidic gases such as $CO_2$ from a gas stream.

The present disclosure relates to a Ca—Na—$SiO_2$—$Al_2O_3$/Sodium-Calcium-Aluminosilicate composition (e.g., a $CO_2$-ONE adsorbent) and a method for making the $CO_2$-ONE adsorbent. The $CO_2$-ONE composition is a Ca—Na—$SiO_2$—$Al_2O_3$/sodium-calcium-aluminosilicate composition. In embodiments of the disclosure the $CO_2$-ONE composition may comprise a mixture of materials such as Gehlenite (e.g., $Ca_2Al(Al_{1.22}Si_{0.78}O_{6.78})OH_{0.22}$) and Stilbite (e.g., $Na_{5.76}Ca_{4.96}(Al_{15.68}Si_{56.32}O_{144})$). The $CO_2$-ONE composition may contain different amounts of Gehlenite and Stilbite. For example, the Gehlenite may be present in an amount of from 40 to 60% by mass and the Stilbite may be present in an amount of 40-60% by mass based on the total weight of the Gehlenite and Stilbite. Preferably the Gehlenite is present in an amount of 41-55, 42-50, 43-48 or 44-46% by mass. Preferably the Stilbite is present in an amount of 45-59, 50-58, 48-57 or 50-53% by mass. The $CO_2$-ONE preferably contains at least 50% by mass, more preferably 60%, 70%, 80%, 90%, 95% or 99% by mass of a total amount of Gehlenite and Stilbite, wherein % by mass is based on the total weight of the $CO_2$-ONE composition.

In another embodiment the $CO_2$-ONE composition comprises a mixture of Gehlenite, Stilbite and Lawsonite (e.g., $CaAl_2Si_2O_7OH_2(H_2O)$). The Gehlenite is preferably present in an amount of 1-10% by mass, more preferably 2-8, 3-6 or 4-5% by mass based on the total mass of Gehlenite, Stilbite and Lawsonite. The Stilbite is preferably present in an amount of 5-15% by mass, more preferably 6-14, 7-13, 8-12 or 9-11% by mass. The Lawsonite is preferably present in an amount of 80-95% by mass, more preferably 81-94%, 82-93%, 83-92%, 84-91%, 85-90%, 86-89% or 87-88% by mass. As is the case for the $CO_2$-ONE composition that comprises Gehlenite and Stilbite without Lawsonite, the Lawsonite-containing $CO_2$-ONE composition preferably contains Gehlenite, Stilbite and Lawsonite in an amount of at least 50% by mass, more preferably 60%, 70%, 80%, 90%, 95% or 99% by mass based on the total mass of the $CO_2$-ONE composition. The $CO_2$-ONE composition may contain other tectosilicate minerals and/or zeolites. Stilbite-Na is preferred over Stilbite-Ca. Because silicon and aluminum ions in Stilbite occupy equivalent positions it is possible for the Si/Al ratio to vary. Variance in the Si/Al ratio must be compensated by adjusting the corresponding sodium/calcium ratio. The Stilbite is ordinarily present in the monoclinic 2/m phase although orthorhombic or triclinic phases may also be present in minor amounts.

Sorosilicates other than Gehlenite may also be present in the $CO_2$-ONE composition. In some embodiments the Gehlenite may be present in an aluminum-rich phase. The Gehlenite has a tetragonal crystal system and may be interlinked with a crystal system of the aluminosilicate framework structure.

Lawsonite, like Gehlenite, is a sorosilicate mineral but is present in its hydrous calcium aluminum form in the present disclosure. Lawsonite is preferably present in a major amount in its orthorhombic phase but may also be present in a minor amount in one or more other phases.

Lawsonite may have an idealized composition of formula of $CaAl_2Si_2O_7(OH)_2$. Gehlenite has an idealized formula of $Ca_2Al(AlSiO_7)$. Stilbite has an idealized formula of $NaCa_4(Si_{27}Al_9)O_{72} \cdot 28(H_2O)$.

The $CO_2$-ONE composition may be obtained by treating mixtures of minerals by heating and/or calcination. Kaolin is a convenient clay mineral that may be used as one precursor to the $CO_2$-ONE composition. Kaolin has an idealized chemical composition of $Al_2Si_2O_5(OH)_4$ although variations in chemical composition are included. Heating kaolin leads to dehydroxylation and formation of materials having a generalized formula of $Al_2Si_2O_7$ which may be further heated to separate portions of $SiO_2$ and form spinels such as $Si_3Al_4O_{12}$. Calcination of kaolin or a spinel or metakaolin derived from kaolin can further drive out $SiO_2$ to form compounds of general formula $Si_2Al_6O_{15}$.

The kaolin may be treated in combination with limestone ($CaCO_3$). Heating mixtures of kaolin and limestone provides a method of forming the $CO_2$-ONE composition of the present disclosure. Treating limestone and kaolin with a base such as NaOH under certain temperature and environmental conditions forms the $CO_2$-ONE composition of the present disclosure.

First, rocks of limestone and kaolin are crushed. Once the rocks are crushed, they are sieved into different particle sizes. The particle sizes of the rocks are in the range of 4 mm-650 µm, 3 mm-550 µm, or 2 mm-450 µm. Preferably, the particle sizes of the rocks are in the range of 2 mm-450 µm. The rocks are then placed in a closed-capped container for further use. Limestone and kaolin are mixed using different amounts of a base containing a single —OH functional group. The base can include but is not limited to sodium hydroxide (NaOH), lithium hydroxide (LiOH), or potassium hydroxide (KOH). Preferably the base is NaOH. The amount of base that is mixed with the sample of limestone and kaolin includes different concentrations in the range of including but not limited to 2 g/100 mL-40 g/100 mL, 3 g/100 mL-38 g/100 mL, or 4 g/100 mL-36 g/100 mL. for a time period in the range of 30 minutes-2 hours, 45 minutes-2.5 hours, or 55 minutes-1.5 hours. Preferably, the amount of base mixed with the sample of limestone and kaolin includes a concentration in the range of 4 g/100 mL-36 g/100 mL over a time period of 1 hour.

The mixed sample of limestone, kaolin, and base is then placed in a hydrothermal reactor operating at different reaction temperatures in the range of 30° C.-300° C., 40° C.-250° C., or 50° C.-200° C. and a pressure in the range of 2 bar-20 bar, 3 bar-18 bar, or 4 bar-15 bar. Preferably, the reaction temperature in the reactor is in the range of 50° C.-200° C. and the reaction pressure in the reactor is in the range of 4 bar-15 bar. Nitrogen is then introduced to the reactor to maintain the desired temperature and pressure ranges.

Once the reaction occurs, the produced samples are cooled to room temperature. Cooling occurs through a natural process in which the samples settle and over time the temperature reaches equilibrium with the air surrounding it. Cooling occurs over a time period in the range of 1 hour-3 hours, 1.5 hours-2.5 hours, or 1.75 hours-2.25 hours. Preferably, cooling occurs over a time period of 2 hours.

Following cooling, the dried residue is subject to calcination treatment. Calcination can be carried out in shaft furnaces, rotary kilns, multiple hearth furnaces, and/or fluidized bed reactors. Calcination is conducted over a time period of 1-4 hours, 1.25-3.5 hours, or 1.5-3.25 hours at a temperature ranging from 400-700° C., 500-650° C., or 525-575° C. Preferably calcination is conducted for about 2 hours at a temperature of 550° C. Following calcination, the sample is washed with deionized water, dried and stored to be used in a sorption-desorption method. The $CO_2$-ONE composition is preferably used as a sorbent for $CO_2$. By contacting the $CO_2$-ONE composition with $CO_2$-containing gaseous phase the $CO_2$ is absorbed by the $CO_2$-ONE composition and its concentration in the surrounding gaseous environment is reduced. The $CO_2$-ONE composition may be used to reduce the amount of $CO_2$ in a gaseous environment by an amount of 50-99.5% by mass based on the total mass of $CO_2$ present in the gaseous environment. Preferably the $CO_2$ concentration in the gaseous environment is reduced by an amount of 60%, 70%, 80%, 90%, 95% by mass based on the total amount of $CO_2$ present in the gaseous atmosphere.

A method of sorption of a sample of $CO_2$ is carried out by placing a fixed amount of different ranges of sample sizes in an isothermal column. $CO_2$ is introduced to the bed from the bottom of the column using a fixed flow rate. The initial concentration of $CO_2$ is in the range of 1.6%-2.2%, 1.7%-12.0%, or 1.8%-1.9% and the flow rate of the $CO_2$ is in the range of 2 L/min-6 L/min, 3 L/min-5 L/min, or 3.5 L/min-4.5 L/min. Preferably, the initial concentration of $CO_2$ is 1.87% and the flow rate is 4 L/min. The concentration of $CO_2$ at the exit stream is measured at different periods of time at one minute intervals ranging from 0 minutes-12 minutes. The difference in concentration between the inlet and outlet streams is calculated. A similar procedure is carried out to detect the sorption capacity of the sample against $CO_2$-free gas to use as a comparison.

After having absorbed $CO_2$ the $CO_2$-ONE composition may be regenerated and/or recycled by desorbing the previously-absorbed $CO_2$. Desorption may be carried out by heating the $CO_2$-containing $CO_2$-ONE composition and passing one or more inert gases over the $CO_2$-ONE composition. At sufficient temperature $CO_2$ will desorb from the $CO_2$-ONE composition. Desorption may remove more than 50%, preferably more than 60%, 70%, 80%, 90%, 95% of the $CO_2$ adsorbed thereon from a gaseous environment.

A method of desorption of a sample of $N_2$ is carried out by placing a fixed amount of different ranges of sample sizes in an isothermal column. $N_2$ is introduced to the bed from the bottom of the column using a fixed flow rate. The initial concentration of $N_2$ is in the range of 1.6%-2.2%, 1.7%-12.0%, or 1.8%-1.9% and the flow rate of the $N_2$ is in the range of 2 L/min-6 L/min, 3 L/min-5 L/min, or 3.5 L/min-4.5 L/min. Preferably, the initial concentration of $N_2$ is 1.87% and the flow rate is 4 L/min. The concentration of $N_2$ at the exit stream is measured at different periods of time at one minute intervals ranging from 0 minutes-12 minutes. The difference in concentration between the inlet and outlet streams is calculated.

EXAMPLE

Preparation of Adsorbent

Rocks of limestone and kaolin were crushed and sieved to different particles sizes ranging from 2 mm-450 μm, then placed in a closed-capped container for further use. A representative sample of each of limestone and kaolin was mixed with different concentrations of sodium hydroxide for 1 h then placed in a hydrothermal reactor operated at different reaction temperature and pressure (Table 1). Nitrogen was introduced to the reactor to maintain the desired pressure. Upon completion of the reaction, the produced samples were cooled to room temperature and exposed to air for 2 h, then calcinated at 550° C. for 2 h. Then the sample was washed with deionized water, dried and stored in closed-container for application. Table 1 is presented below.

TABLE 1

Full factorial design for proposed experiments

| DESIGN ORDER | EXP RUN ORDER | Carbonate (g) A | [NaOH] (g/100 ml) B | Temperature C | Pressure (bar) D |
|---|---|---|---|---|---|
| 1 | 1 | 2 | 4 | 50 | 15 |
| 2 | 2 | 6 | 4 | 50 | 4 |
| 3 | 3 | 6 | 4 | 50 | 15 |
| 4 | 4 | 2 | 4 | 50 | 4 |
| 5 | 5 | 2 | 36 | 50 | 4 |
| 6 | 6 | 6 | 36 | 50 | 4 |
| 7 | 7 | 2 | 36 | 50 | 15 |
| 8 | 8 | 6 | 36 | 50 | 15 |
| 9 | 9 | 2 | 4 | 200 | 4 |
| 10 | 10 | 6 | 4 | 200 | 4 |
| 11 | 11 | 2 | 4 | 200 | 15 |
| 12 | 12 | 6 | 4 | 200 | 15 |
| 13 | 13 | 6 | 36 | 200 | 15 |
| 14 | 14 | 2 | 36 | 200 | 4 |
| 15 | 15 | 6 | 36 | 200 | 4 |
| 16 | 16 | 2 | 36 | 200 | 15 |

EXAMPLE

Sorption-Desorption Procedure

Sorption-desorption procedure was carried out by placing fixed amount of different particle sizes of the produced sample in an isothermal column. Gas stream containing a fixed concentration of $CO_2$ were introduced to the bed from the bottom of the column at fixed flow rate. Then the concentration of $CO_2$ at the exit stream was measured at different periods of time and the difference in concentration between the inlet and outlet streams were calculated. Similar procedure was used to detect the sorption capacity of the sample against $CO_2$-free gas for comparison. Desorption procedure was similar to the above procedure except that nitrogen gas was introduced instead of CO2. All the experiments were repeated at different conditions such as bed temperature and gas flow rate.

A new adsorbent $CO_2$-ONE for removal of acidic gases such as carbon dioxide and hydrogen sulfide was developed from hydrothermal reaction of natural limestone with natural kaolin and sodium hydroxide. Several synthesis conditions were employed such as initial concentration of NaOH, weight ratio of limestone to kaolin, reaction temperature and pressure. The produced Ca—Na—$SiO_2$—$Al_2O_3$ samples were characterized using XRD and EDS and showed that a mixture of Gehlenite $Ca_2Al(Al_{1.22}Si_{0.78}O_{6.78})OH_{0.22}$ and Stilbite $Na_{5.76}Ca_{4.96}(Al_{15.68}Si_{56.32}O_{144})$ with percentage of 43 and 57 was successfully produced, respectively. Another produced sample showed the presence of Gehlenite $Ca_2Al(Al_{1.22}Si_{0.78}O_{6.78})OH_{0.22}$ Stilbite $Na_{5.76}Ca_{4.96}(Al_{15.68}Si_{56.32}O_{144})$ and Lawsonite $CaAl_2Si_2O_7OH_2(H_2O)$ with percentage of 4.1 and 7.4 and 88, respectively.

Both produced samples were tested for adsorption/desorption of $CO_2$ at 22° C. and 1 atm, and compared with raw materials and found that for a given mass of sample of 13.5 g, initial flow rate and concentration of $CO_2$ of 4 L/min and 1200 mg/L, respectively, the breakeven adsorption curves as follows: for the produced sample it took 59 min to get saturated with $CO_2$ while limestone and kaolin took 0.27 and 0.23 min, respectively to reach the same saturating value.

The adsorptions of $CO_2$ by the treated samples follow chemisorptions process where a chemical reaction between the $CO_2$ and the surface took place. This sorption is enhanced with increasing bed temperature which concludes endothermic process at the surface of the produced samples.

Figure 1:
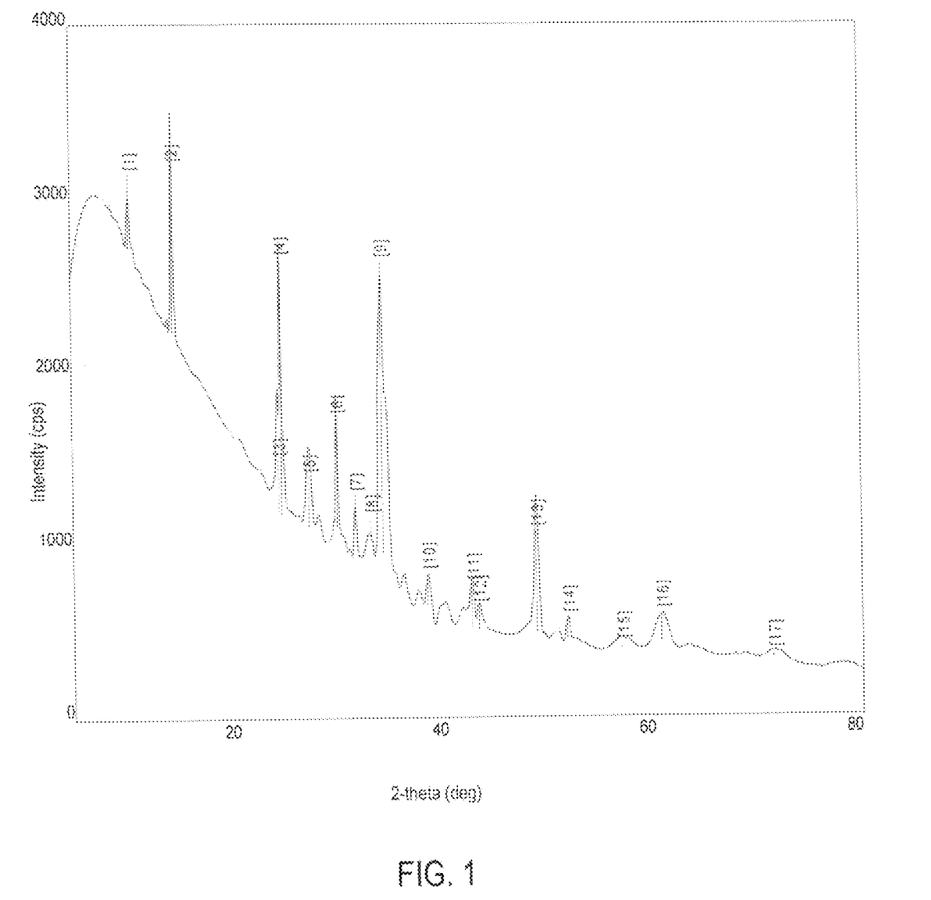
FIG. 1 is an X-Ray diffraction diagram for the $CO_2$-ONE adsorbent.
Figure 2:
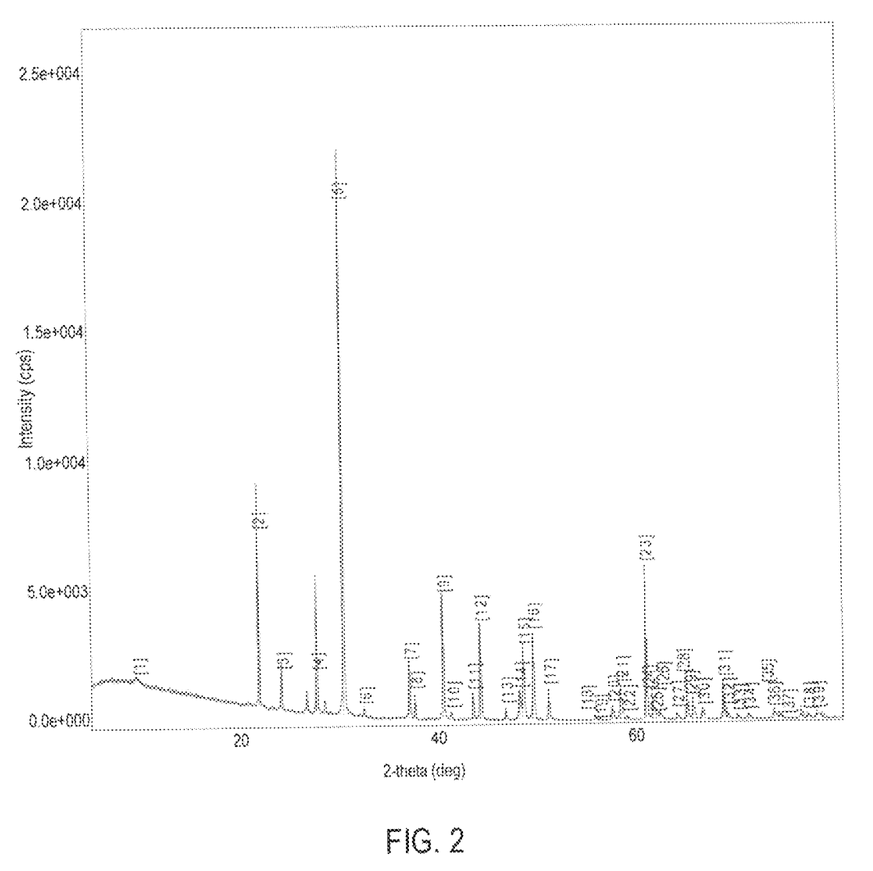
FIG. 2 is an X-Ray diffraction diagram of natural limestone, calcite, and quartz.
Figure 3:
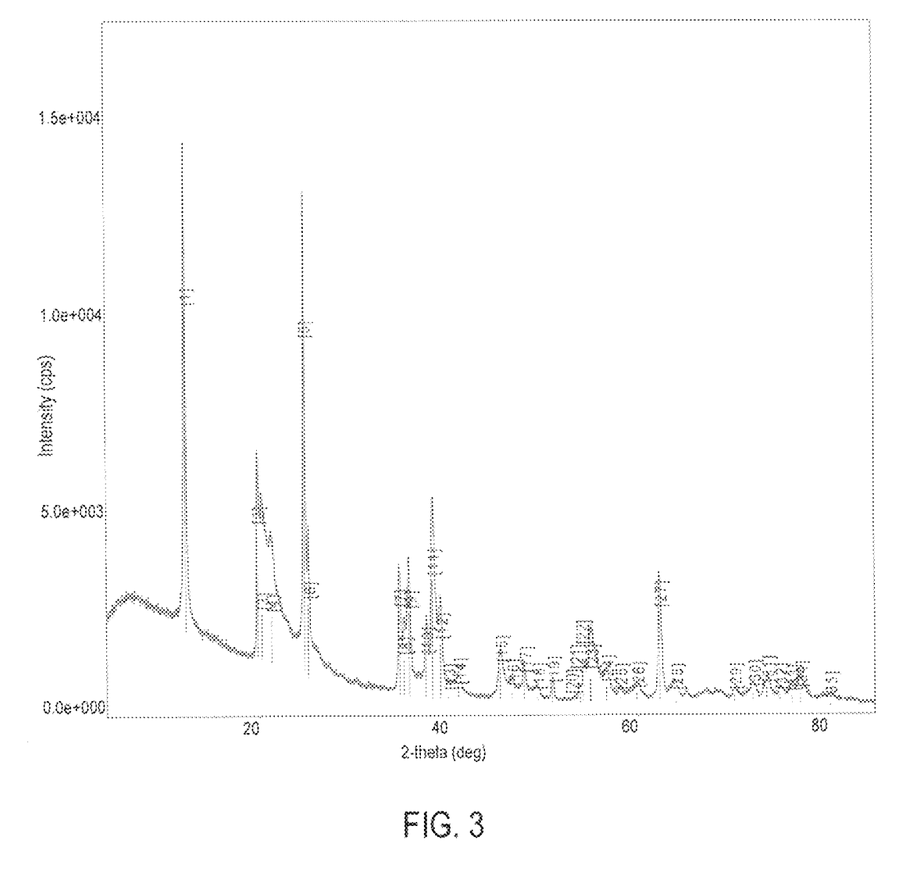
FIG. 3 is an X-Ray diffraction diagram of natural kaolin, kaolinite, and anatase.
Figure 4:
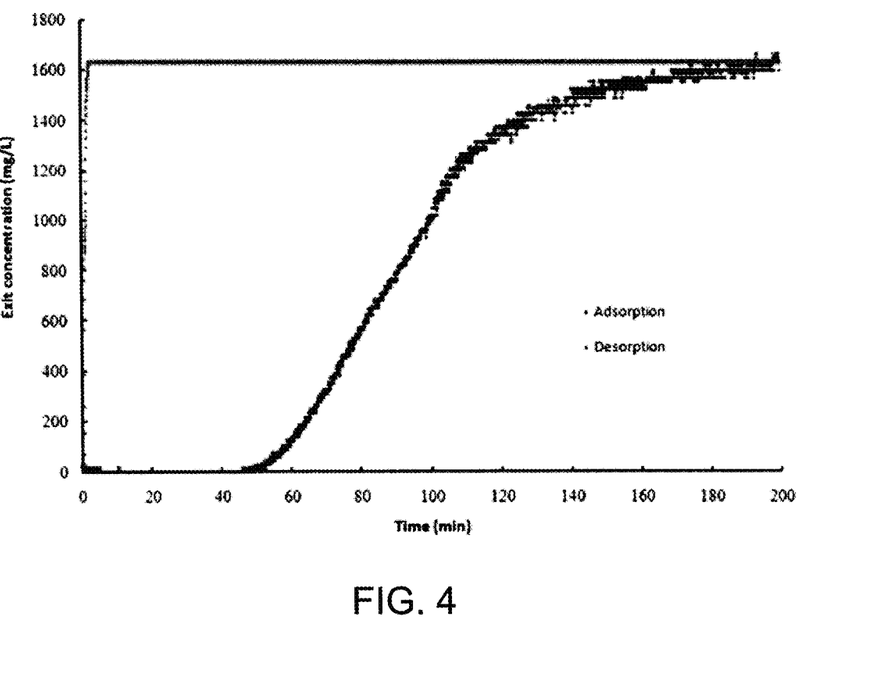
FIG. 4 is a diagram of a breakeven curve for adsorption/desorption of $CO_2$ by $CO_2$-ONE adsorbent.
Figure 5:
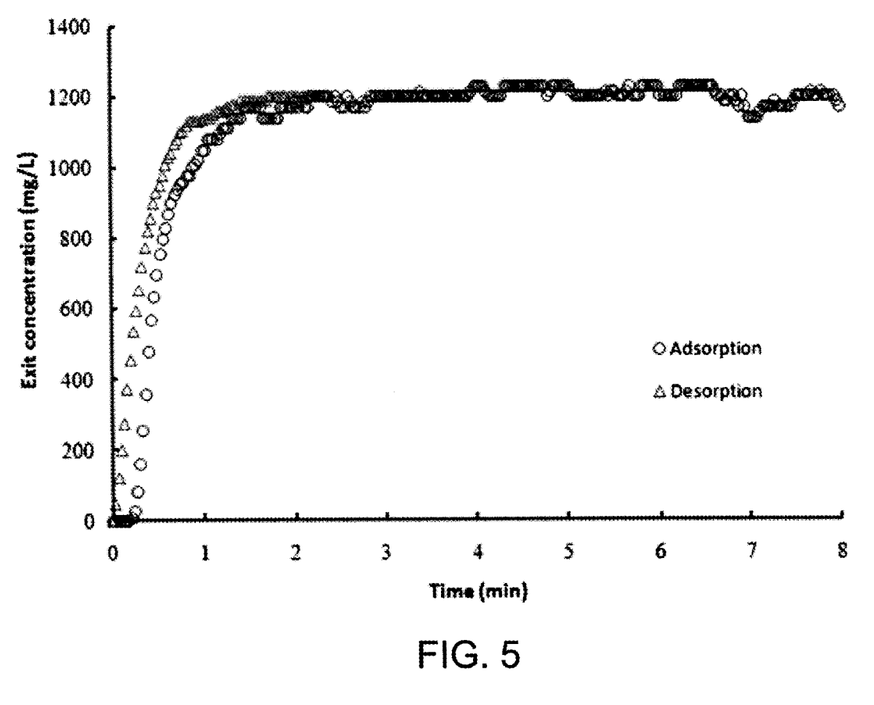
FIG. 5 is a diagram of a breakeven curve for adsorption/desorption of $CO_2$ by limestone.
Figure 6:
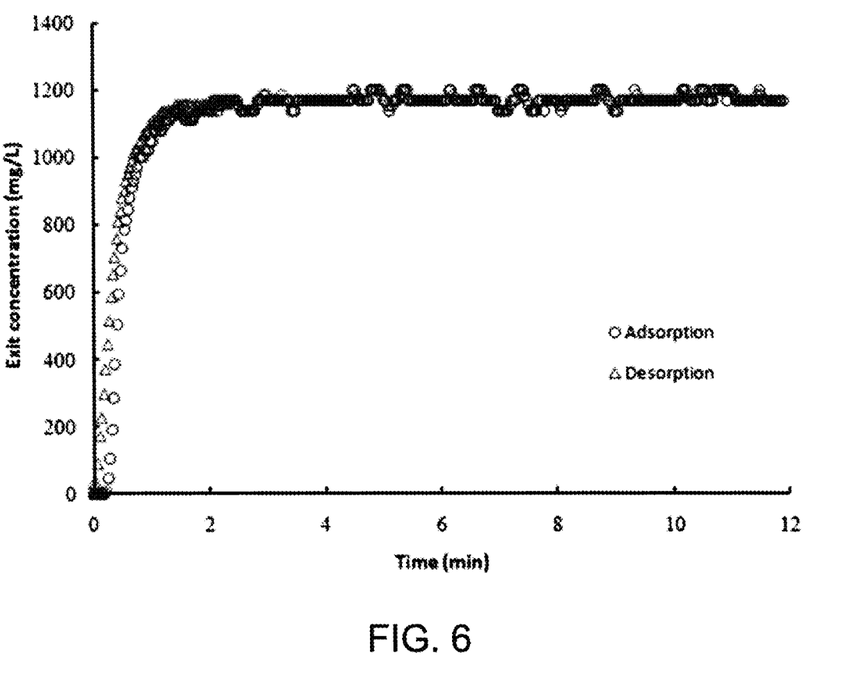
FIG. 6 is a diagram of a breakeven curve for adsorption/desorption of $CO_2$ by kaolin.
Figure 7:
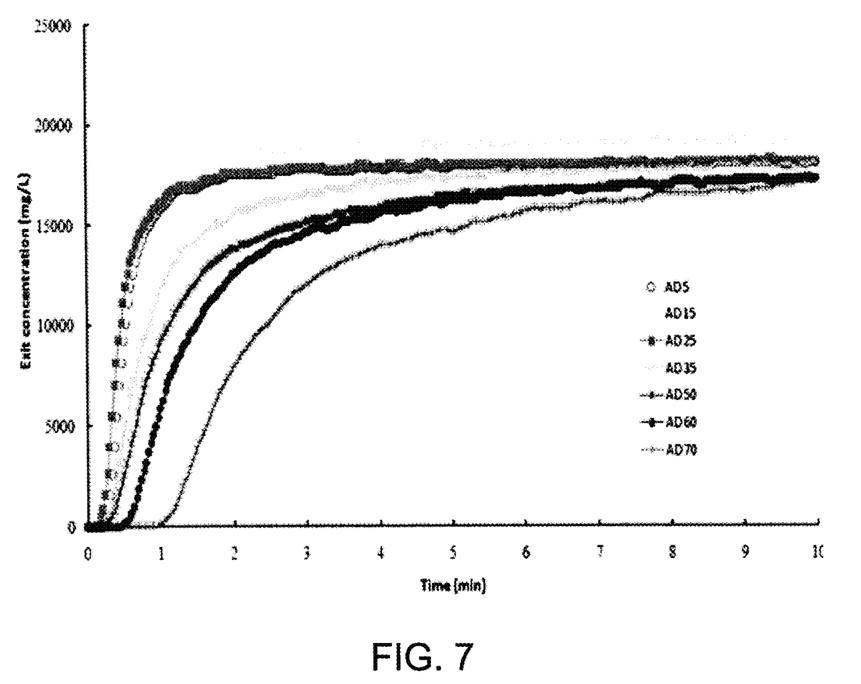
FIG. 7 is a diagram of the effect of temperature on the adsorption of the $CO_2$-ONE adsorbent.
Figure 8:
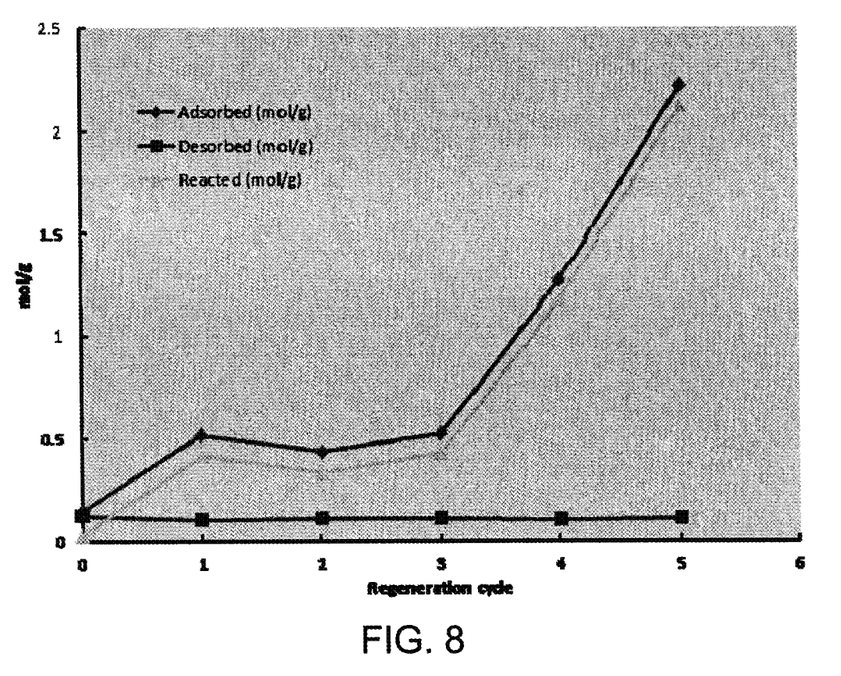
FIG. 8 is a diagram of the effect of the regeneration cycles on the amount of $CO_2$ adsorbed, desorbed and reacted onto the $CO_2$-ONE adsorbent.

The new adsorbent was tested after several regeneration cycles with 14 M NaOH and found that its capacity increases with increasing the regeneration cycles as a result of more Na oxide linked aluminosilicate structure with the treatment of NaOH. When the initial gas concentration is 1.87% and the flow rate is 4 L/min, the maximum adsorption capacity initially is 0.143 mol/g, followed by 0.513 mol/g after $1^{st}$ regeneration, by 0.435 mol/g after $2^{nd}$ regeneration, by 0.526 mol/g after $3^{rd}$ regeneration, by 1.272 mol/g after $4^{th}$ regeneration and by 2.223 mol/g after $5^{th}$ regeneration. FIG. 1 is an XRD for the produced CO2-ONE adsorbent. FIG. 2 is an XRD of natural limestone, Calcite 34%, and Quartz 66%. FIG. 3 is an XRD of natural kaolin, Kaolinite 83.5% and Anatase 16.5%. FIG. 4 is a graph depicting a breakeven curve for adsorption/desorption of CO2 by CO2-ONE adsorbent. FIG. 5 is a graph depicting a breakeven curve for adsorption/desorption of CO2 by Limestone. FIG. 6 is a graph depicting a breakeven curve for adsorption/desorption of CO2 by Kaolin. FIG. 7 is a graph depicting the effect of temperature (5, 15, 25, 35, 50, 60, and 70° C.) on the adsorption of the CO2-ONE adsorbent. The initial $CO_2$ concentration was 18700 mg/L (1.87%). FIG. 8 is a graph depicting the effect of regeneration cycles on amount of CO2 adsorbed, desorbed and reacted onto CO2-ONE adsorbent. The initial CO2 concentration was 18700 mg/L (1.87%).

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A $CO_2$ adsorption column, comprising:
   an gas adsorption column having:
   a $CO_2$ inlet,
   a gas outlet, and
   an adsorption/desorption bed disposed inside the column between the $CO_2$ inlet and the gas outlet,
   wherein the adsorption/desorption bed comprises a Ca—Na—$SiO_2$—$Al_2O_3$/Sodium-Calcium-Aluminosilicate composition comprising 3-6% gehlenite, 5-9% stilbite, and 86-92% lawsonite.

2. The $CO_2$ adsorption column of claim 1, wherein the Ca—Na—$SiO_2$—$Al_2O_3$/Sodium-Calcium-Aluminosilicate composition comprises 4-5% gehlenite, 6-8% stilbite, and 87-91% lawsonite.

3. The $CO_2$ adsorption column of claim 1, wherein the Ca—Na—$SiO_2$—$Al_2O_3$/Sodium-Calcium-Aluminosilicate composition comprises 4.1% gehlenite, 7.4% stilbite, and 88% lawsonite.

4. The $CO_2$ adsorption column of claim 1, wherein the adsorption/desorption bed has an acidic gas adsorption capacity of 0.10 mol/g to 0.2 mol/g after a $1^{st}$ regeneration cycle.

5. The $CO_2$ adsorption column of claim 1, wherein the adsorption/desorption bed has an acidic gas adsorption capacity of 2.0 mol/g to 2.5 mol/g after a $5^{th}$ regeneration cycle.

* * * * *